INVENTOR.
PAUL. M. ENGLE.
BY
ATTORNEY

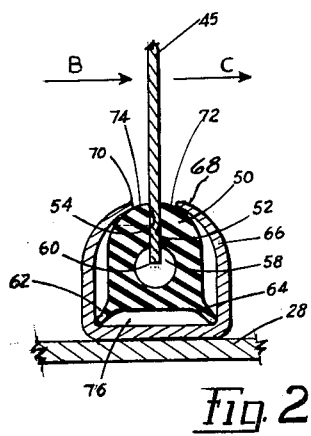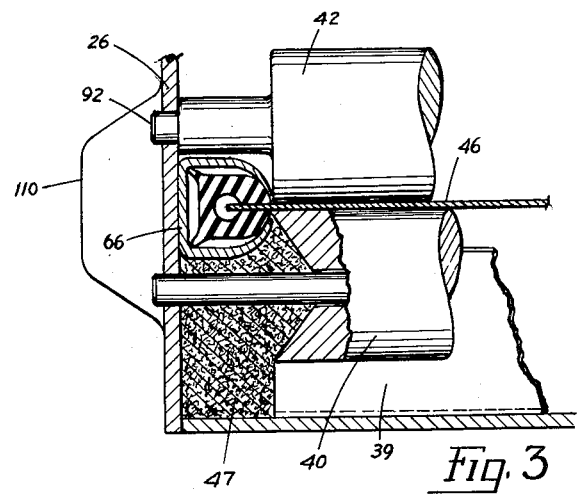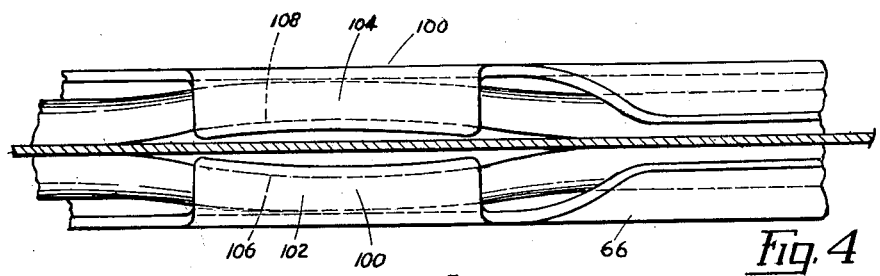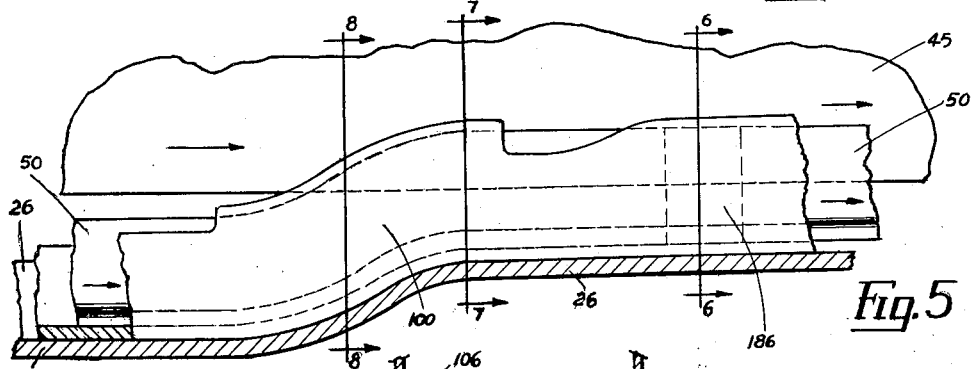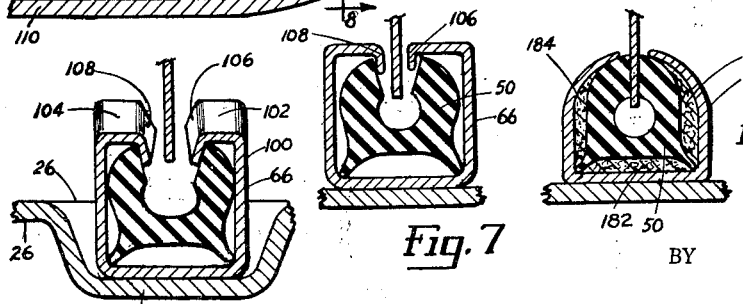
Feb. 6, 1962 P. M. ENGLE 3,019,855
FILTERS
Filed April 9, 1958 3 Sheets-Sheet 2
INVENTOR.
PAUL. M. ENGLE.
BY
ATTORNEY

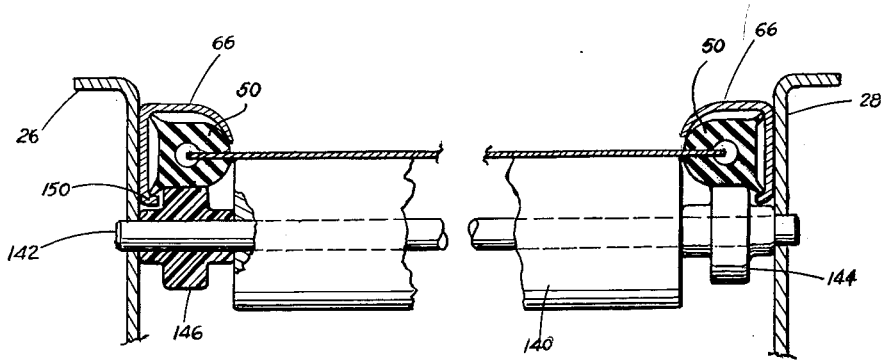
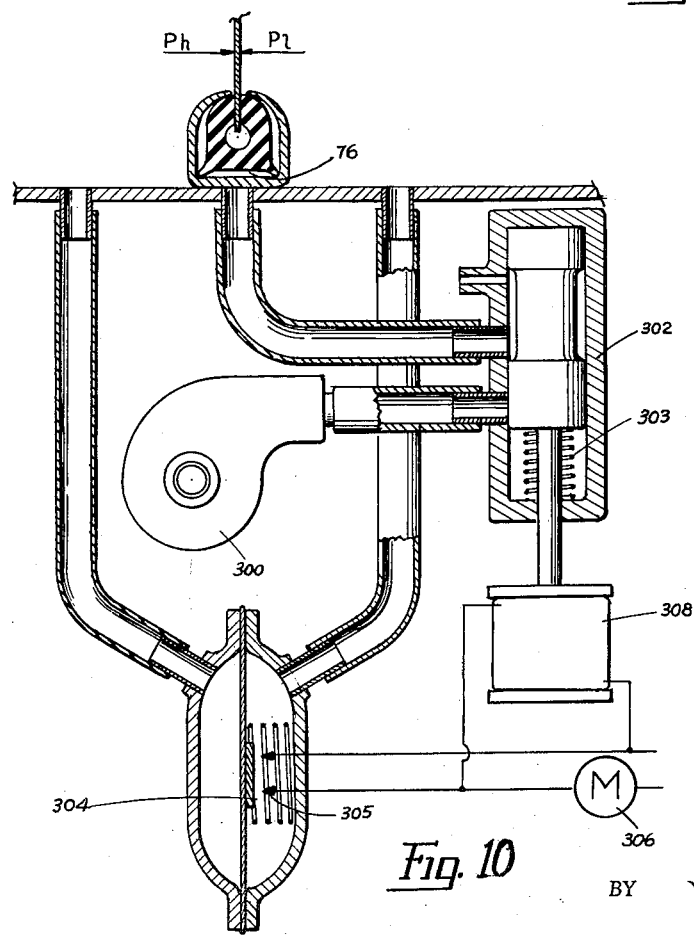

United States Patent Office 3,019,855
Patented Feb. 6, 1962

3,019,855
FILTERS
Paul M. Engle, Syracuse, N.Y., assignor to Cambridge Filter Manufacturing Corporation, a corporation of New York
Filed Apr. 9, 1958, Ser. No. 727,411
2 Claims. (Cl. 183—62)

This invention relates to an automatic air filter adapted to employ flexible sheet filter media in roll form whereby the filter media may be continuously renewed, as the exposed active portion thereof is rendered inefficient and dirty from active duty.

In high efficiency filters, it is desirable to provied maximum filtration area, in a minimum of space so that back pressure will be kept low. Disposition of filter medium in plaited form is employed for this purpose to secure the extended area. Filter material in general is low in tensile strength and cannot by itself be fed over or drawn over a plurality of passes in a plaited path without danger of rupturing the media. It is also essential that a perfect seal between filter media and the casing be maintained to assure against any possible bypass.

The present invention is directed to apparatus for supporting filter media in a plaited form, and providing corresponding trackways or paths edgewise of the media together with supporting and feeding means for the media and associated with the paths, whereby the media may be continuously fed along the path at a rate necessary to replace spent media to maintain satisfactory efficiency by introducing clean filter media. The invention is further directed to providing a filter in which the media is continuously fed through an extended sinuous path, and in which the filter media is supported at its edges in endless sealing and gripping belts which provide the feeding traction for the media as it progresses through the plaits of its sinuous path, the belts relieving the media from strain and rupture which would otherwise be liable to occur and providing the necessary seal along the edges, as is necessary to prevent bypass, particularly in high efficiency filters.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 2 is an enlarged fragmentary sectional view taken at 2—2 in FIGURE 1, showing the channel guide and sealing belt, cooperating with the filter media;

FIGURE 3 is a sectional view as at 3—3 of FIGURE 1 showing the sealing rolls, at the opposite ends of the active portion of the filter media;

FIGURE 4 is a fragmentary enlarged view showing a belt spreader for engaging and disengaging the endless belts from the edges of the filter media;

FIGURE 5 is a fragmentary enlarged side elevational view of the belt spreader;

FIGURE 6 is a sectional view taken on the line 6—6 of FIGURE 5;

FIGURE 7 is a sectional view taken on the line 7—7 of FIGURE 5;

FIGURE 8 is a sectional view taken on the line 7—7 of FIGURE 5;

FIGURE 9 is a sectional view through one of the guide rollers supporting the plaits, taken, for example, on the line 9—9 of FIGURE 1; and FIGURE 10 is a diagrammatic pressure control system for the automatic advancing of the filter.

Figure 1:
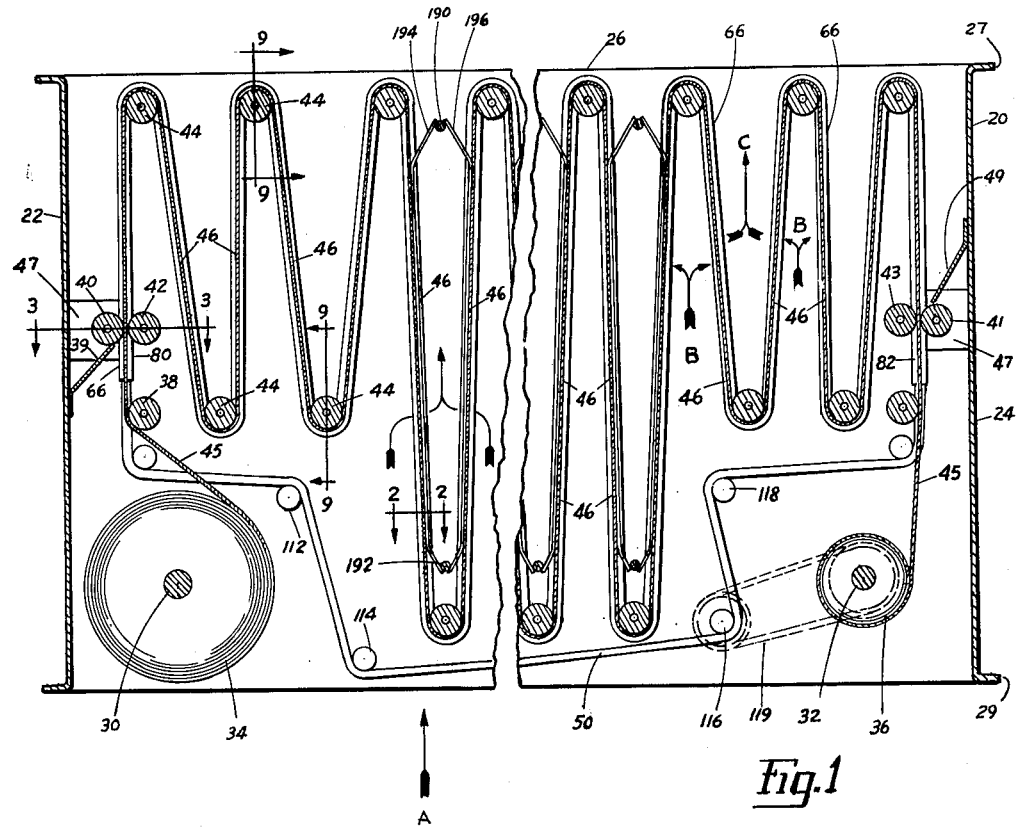
FIGURE 1 is a sectional view through the automatic filter showing the general arrangement.

Referring to FIGURE 1, there is shown a rectangular casing 20, which is open at either side, and which is adapted to be placed in an air duct, or the like, to filter air passing therethrough, usually under blower pressure. The casing is provided with end walls 22 and 24, and side walls 26 and 28, having flanges 29 and 27 for attachment to the inlet and outlet air ducts respectively. Air is caused to flow through the casing in the direction of arrow A. Shafts 30 and 32, suitably journalled in the opposite casing side walls 26 and 28, are adapted to support a supply of clean filter media 34 in roll form, and a reel for rolling up expended dirty filter media as at 36, rendered inefficient and unfit through extended filter service.

The filter media 45 extends from the supply roll 34, around a guide roll 38 having pivots in the opposite side walls 26 and 28, and between a pair of opposed rolls 40, 42 which form a seal, after which the filter media extends over rolls such as generally indicated at 44, and which are disposed in staggered relation, to provide a sinuous path or plaited path. The rolls 44 support the series of folds of the plaits and between which the active planar filtering surfaces 46 are positioned. The endwise plaits may be of lesser depth, as shown, to accommodate the rolls 30 and 32 but in the intermediate portion of the filter, such plaits preferably extend across the filter frame so as to provide filtering surfaces 46 of maximum area. Air entering as at A, divides between adjacent surfaces, and travels to and through the filter media as is indicated by arrows B, and the filtered air leaves the filter as indicated by arrows C.

In order to support the filter medium and also to provide means whereby the filter medium may be continuously advanced without straining such material to the rupture point, a pair of endless belts of U section are provided, which belts are adapted to engage the opposite marginal edges of the elongated sheet of filter material. The belts support such filter sheet along its opposed edges, and grip the sheet so as to provide the necessary feeding means for the filter sheet. As shown in FIGURE 2 such belts may each have a cross section of U shape, the belt 50 having spaced gripping faces 52 and 54 which are adapted to bear against and grip the lengthwise marginal surfaces along the edge of the filter medium 45. The belt is provided with an enlarged aperture 58 extending lengthwise thereof to control the flexibility of the gripping faces 52 and 54 and to provide clearance for the actual edge 60 of the filter material which may be irregular in width, it being preferable to grip the opposed marginal surfaces along the edge with the gripping faces 52 and 54 of the belt. The belt may also have fins 62 and 64 extending from the opposite outer corners thereof, such fins extending lengthwise the entire length of the belt. The belt travels in a U shaped channel guide 66 which extends lengthwise along the sinuous edge of the filter medium. Each channel member at opposite sides of the casing is affixed in an air tight manner to the side walls 26 and 28 respectively of the filter casing, and the flanges 68 and 70 thereof are inwardly bent so as to lightly engage the curved shoulders 72 and 74 of the belt. In practice air under light pressure may be maintained in the cavity indicated at 76 and such air under pressure will tend to flex the fins 62 and 64 into sealing engagement with the side flanges of the channel member and urge the belt shoulders 72 and 74 into sealing engagement with the inwardly bent flanges 68 and 70 of the channel member. It will be understood that air pressure will tend to seal the belts and their engagements with their respective channel members, as well as their engagement with the marginal edge surfaces of the filter media. Such pressure may introduce friction, but by relieving the pressure at such time as feeding of the belts is to be effected, the friction is temporarily eliminated during advancing of the belts.

Referring again to FIGURE 1 the channel guide 66, on each side, commences at the approximate position of the sealing rolls 40 and 42 as indicated at 80 and extends continuously along so as to embrace the edge of the filter media 45, through the belts, from a point adjacent the entrance of the media into the sealing rolls 40 and 42 to the exit sealing rolls 41 and 43 adjacent the region 82 where the channel members end.

The sealing rolls extend crosswise of the filter media 45. The rolls 40 and 41 may be of soft rubber so as to sealingly engage with one side of the filter media, while the rolls 42 and 43 provide back-up pressure. A felt block 47 fitting the space between the channel flange, and the exposed portion of the belt, is provided at the opposite ends of each of the rolls 40 and 41, such felt blocks engaging the roll ends. The central portion of the rolls 40 and 41 are cylindrical and engage the filter paper 45 through its entire width between the side belts. The back up rolls 42 and 43 are freely pivoted on their respective shafts 92 in the side walls 26 and 28 and extend from belt to belt to provide back up pressure along the entire length of rolls 41 and 42. One or both of such rolls may be of soft resilient material such as rubber so as to provide uniform pressure between the rolls along the entire axial length thereof. A flexible plate 39 wiping on the roll 40, and a plate 49 wiping on the roll 41, closes off the space between their respective rolls and the adjacent felt blocks and frame members.

Each of the belts is in continuous engagement with the edges of the active portion of the filter media for the length of the channels, which channels have been described as extending from the approximate position 80 to the position 82 (see FIG. 1). The belts are adapted to come into a gripping relation with the marginal edges of the filter media just prior to passing the sealing rolls 40 and 42 in the region 80, and are adapted to release their grip on the media after passing the sealing rolls 41 and 43 in the region 82. In order to spread the U section of the belt which by its resiliency normally lightly grips the filter media, preparatory to bringing the belts into gripping relation, or for spreading the belts to release their grip, the end of the channel 66 both in the regions 80, and 82, as is shown in FIGURES 4 through 8, is provided with an offset section 100 having opposite flanges 102 and 104 with depending spreader tongues 106 and 108 which are adapted to extend into and spread the U section of the belt as it is brought into gripping relation with the media edge, as at 80, or to spread the belt out of contact as at 82. The spreading tongues are disposed in an offset section of the belt channels, which serve to move the belt into embracing relation with the media edge, or remove the belt clear of the edge. The flanges 102 and 104 serve to cover the belt to travel an offset path corresponding with the offset section 100.

As indicated in FIGURES 3 and 5 the side walls 26 and 28 may have outwardly offset channels 110 formed therein to receive the belts in their outwardly offset plane laterally disposed slightly from the edge of the filter media as is indicated in FIGURE 5. The portion of the belt which is always free from the filter medium and which may be referred to as the return portion, may be recessed in such an offset channel as 110 so as to clear the edges of the filter media as it leaves the roll 34. Thereafter the belt extends over guide rolls such as 112, 114, 116, 118 which establish a path for the free portion of the belt which does not interfere with the filtering surfaces. If it is desired to have a smooth wall casing, so that multiple units may be mounted side by side, the filter media before it reaches the region 80, and after leaving the region 82, may be curved or buckled transversely to draw the edges inwardly slightly, where the channels spread the belts, so that the channels may extend without offset, as has been referred to and indicated at 110.

Where the plaits of the filter media pass over rolls such as 44, there are provided supporting rolls 140 which extend across the width of the filter medium to the opposite belts 50—50. Such rolls are freely journalled on a shaft 142 which extends between the housing side walls 26 and 28 and such shaft carries adjacent each end thereof, the rollers 144 and 146 which are adapted to bear against the sides of the opposite belts 66 to guide the belts around the bend in such manner as to conform to the curvature of the filter media in passing over and around the rolls 140. A small portion of the channel member is removed to provide clearance for the rolls 144 and 146 as at 150.

In practice, power will be applied to each of the belts as by driving each of their respective rollers such as 116. The rollers 116, for each belt, may be affixed to a common drive shaft, so as to coordinate the belt drives. The belts by reason of the spreaders 100 will open up, and on closing, will grip the edge of the filter media, in region 80 for example, immediately prior to carrying the filter media through the sealing rolls 40 and 42 and the continuous feed of the belts or intermittent feed, if desired, will thus feed the entire length of the active portion of the filter media 45 so as to pass around the sequence of plait forming rolls 44. After the filter media passes seal-rollers 41 and 43, the spreader 100 at 82, will separate the edge of the filter media from the belts. A suitable friction drive such as a garter spring belt 119 may interconnect the drive roll 116 and the roll 36 whereby to take up the slack consisting of the used or spent portion of the filter media. No particular power need be applied to the reel 34 which will freely feed filter material in accordance with the rate of demand created by the advancing of the belts which engage and support the marginal edges of the filter material throughout the active filtering length thereof.

In practice, the difference in pressure on the opposite sides of the filter medium may be employed to regulate the rate of feed, an increase in differential pressure indicating inefficiency and spent filter material. As the differential pressure increases on the opposite sides of the active portion of the filter material, increments of fresh filter material may be introduced from the reel 34 at the left hand end and the spent filter material will be rolled up on the reel at 36. The introduction of fresh filtered material at the left hand end will tend to reduce the differential pressure whereby the feed may slow down or be discontinued. The feed may also be regulated by timer control, without reference to differential pressure, in which increments of new filter media will be introduced at timer controlled spaced intervals, which intervals and amount of fresh media may be varied to suit conditions such as amount of dust or dirt loading in the air, and the amount of differential pressure variation which may be tolerated. It will be seen that the belts elastically grip the filter material. The fins tend to lightly move the belts outward in their respective channels, and the inwardly flared flanges tend to squeeze the filter media gripping portions of the belt so as to provide a mechanical seal along the entire length. It will also be understood that the channels themselves are affixed to the side walls in an air tight manner.

In order to further effect an air tight seal between the belt, the channel members, and the edge of the filter medium, light air pressure may be introduced into the area between the back of the belt, the fins 62 and 64, and the base of channel member. A suitable seal at opposite ends of the channel members will be provided, such seal engaging the under face of the belts and fins to prevent end leakage. The sealing effect resulting from such pressure will be effective to assure against by-pass. If desired, however, the pressure introduced may be relieved when it is desired to advance the filter media, and thereafter reestablished so that a minimum of friction to the advancement of the belts and the filter material will be present when such filter material advancement is required.

For this purpose, air under light pressure, of a fraction of a pound per square inch, may be admitted to the space 76 behind each of the belts from a blower 300 connected through a valve 302 to pressurize the cavity. The valve is biased to exhaust by a spring 303. When the pressure $P_h$ on the inlet side of the filter increases sufficiently over the pressure on the outlet side $P_l$, the pressure sensitive diaphragm 304 closes the circuit contacts 305 through the belt drive motor 306, deenergizing solenoid 308, which in turn exhausts the cavity 76. The motor then drives the belt rolls 116 until the pressure difference drops due to the introduction of a certain amount of fresh filter media. The contacts 305 then open, and the potential across the solenoid 308, actuates the valve downwardly to introduce pressure from blower 300 into the opposite belt cavities 76. The respective belt channels, at points between the offsets 100, and the seal rolls 40 and 41, may be provided with sealing segments to block off the space between the inside channel walls and the belts and the blower will supply air to overcome any leakage. As indicated in FIGS. 5 and 6, the segments 182, 184 and 186 of felt or other material block off the channel ends, and prevent leakage from the cavity 76, at the channel ends.

Support guides in the form of wires extending along the filter media panels 46, on the down-stream side, are provided to prevent the differential pressure on the opposite sides of the media from collapsing adjacent panels against one another, and to prevent bowing under such pressure, which bowing would stress the media. For the purpose, between each pair of panels 46, on the down-stream side, transverse support rods 190 and 192 extending between the side members 26 and 28, may be provided, which in turn will support a plurality of wires such as 194 and 196, which extend from the rod 190 to the rod 192, the wires 194 and 196 extending in the direction of movement of the filter media. The major portion of the length of each wire 194 and 196 is offset into the plane of its panel 46 that it is intended to support, so as to provide a support between the adjacent rolls 140 for the particular panel. Such wires are illustrated between the longer panels only, but may also be applied to the shorter panels where the distance between supporting rolls 140 for the particular panel is so great as to require intermediate support.

The individual wires 194, or 196, supporting a particular panel, may be spaced transversely as is necessary, for example every inch, although such spacing will vary with conditions, such as the operating differential pressure and the nature and tensile strength of the filter media.

The edgewise belts 50 will be flexible and yieldable transversely, but inelastic lengthwise, as by providing embedded lengthwise cords or the like, not shown, as will be readily understood in the art.

While drive of the rolls 116 only by the motor 306 has been referred to, it will be understood that if additional traction on the belts is required, other rolls such as 114, and even some of the rolls 146 (FIG. 9), may have power applied, as by belting or other gearing (not shown) as will also be understood in the art, the only requirement being that such rolls should all have a uniform peripheral velocity.

Although a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An air filter, comprising means defining a path for the flow of air, a supply of filter media in roll form, having an intermediate portion thereof traversing said path, spaced endless belt means of U section adapted over a portion of their length to embrace and engage the respective marginal side edge surfaces of the traversing portion of said filter media, guide channels having inturned flanges disposed along the engaging portion of said belts, continuous running sealing means carried by said belts and extending to the adjacent side flanges of their respective channels, and means for pressurizing said channels behind said running sealing means, means for intermittently driving said belts to advance said filter media across said path and means responsive to an increase in differential pressure across said media, to simultaneously depressurize said channels during advancing of said filter media.

2. An air filter, comprising means defining a path for the flow of air, a supply of filter media in roll form, having an intermediate portion thereof traversing said path, spaced endless belt means of U section adapted over a portion of their length to embrace and engage the respective marginal side edge surfaces of the traversing portion of said filter media, guide channels having inturned flanges disposed along the engaging portion of said belts, continuous running sealing means carried by said belts and extending to the adjacent side flanges of their respective channels, and means for pressurizing said channels behind said running sealing means, means for intermittently driving said belts to advance said filter media across said path, means responsive to an increase in differential pressure across said media, to simultaneously depressurize said channels during advancing of said filter media and means responsive to differential pressure on opposite sides of said filter media portion to actuate said last named means.

References Cited in the file of this patent

UNITED STATES PATENTS

| 1,868,278 | Denison | July 19, 1932 |
| 1,965,717 | Wechsberg | July 10, 1934 |
| 1,991,137 | Case et al. | Feb. 12, 1935 |
| 2,016,991 | Dollinger | Oct. 8, 1935 |
| 2,030,552 | Strindberg | Feb. 11, 1936 |
| 2,218,453 | Mickle | Oct. 15, 1940 |
| 2,724,254 | Zanger | Nov. 22, 1955 |
| 2,850,113 | Turner | Sept. 2, 1958 |